United States Patent [19]

Suzuki et al.

[11] Patent Number: 5,084,078

[45] Date of Patent: Jan. 28, 1992

[54] EXHAUST GAS PURIFIER UNIT

[75] Inventors: Nagatoshi Suzuki, Tokyo; Kanichi Fujii, Hitachi, both of Japan

[73] Assignee: Niles Parts Co., Ltd., Tokyo, Japan

[21] Appl. No.: 618,942

[22] Filed: Nov. 28, 1990

[51] Int. Cl.⁵ .................................................. B03C 3/00
[52] U.S. Cl. ......................................... 55/122; 55/146; 55/152; 55/155; 60/279; 60/275; 60/310
[58] Field of Search ................ 55/118, 119, 122, 151, 55/152, 146, 155; 60/275, 279, 310

[56] References Cited

U.S. PATENT DOCUMENTS

| | | | |
|---|---|---|---|
| 109,601 | 11/1870 | Dunderdale | 422/186.07 |
| 512,265 | 1/1894 | Andreoli | 422/186.07 |
| 640,694 | 1/1900 | Otto | 422/186.07 |
| 672,231 | 4/1901 | LaComme | 204/228 |
| 788,557 | 5/1905 | Sahlstrom | 422/186.18 |
| 832,768 | 10/1906 | Bridge | 422/186.14 |
| 871,652 | 11/1907 | Ward | 422/186.15 |
| 995,958 | 6/1911 | Goldberg | 422/186.18 |
| 1,157,859 | 10/1915 | Freet | 422/186.19 |
| 1,381,719 | 6/1921 | McGee et al. | 55/122 |
| 1,787,955 | 1/1931 | Rosencrans | 55/151 |
| 1,828,631 | 10/1931 | Whitney | 55/151 |
| 1,828,646 | 10/1931 | Dantsizen | 55/122 |
| 1,957,808 | 5/1934 | Rosecrans | 55/151 |
| 2,195,431 | 4/1940 | Shively et al. | 204/31 |
| 2,989,144 | 6/1961 | Styrie | 183/6 |
| 3,124,437 | 3/1964 | Lagarius | 55/152 |
| 3,157,479 | 11/1964 | Boles | 55/146 |
| 3,526,081 | 9/1970 | Kusters | 55/127 |
| 3,620,008 | 11/1971 | Newbold | 60/30 |
| 3,653,185 | 4/1972 | Scott et al. | 55/103 |
| 3,768,258 | 10/1973 | Smith et al. | 60/275 |
| 3,917,470 | 11/1975 | Xmris et al. | 55/139 |
| 3,979,193 | 9/1976 | Sikich | 55/123 |
| 4,010,011 | 3/1977 | Reif | 55/127 |
| 4,309,199 | 1/1982 | Suzuki | 55/127 |
| 4,320,301 | 3/1982 | Kogelschatz | 422/186.18 |
| 4,326,862 | 4/1982 | Suzuki | 55/127 |
| 4,587,807 | 5/1986 | Suzuki | 55/274 |
| 4,603,031 | 7/1986 | Gelbman | 422/186.18 |
| 4,690,803 | 9/1987 | Hirth | 422/186.18 |
| 4,693,870 | 9/1987 | Gloor et al. | 422/186.19 |
| 4,725,412 | 2/1988 | Ito | 422/186.19 |
| 4,905,470 | 3/1990 | Reichle et al. | 60/275 |
| 4,908,047 | 3/1990 | Leonard | 55/10 |

FOREIGN PATENT DOCUMENTS

| | | | |
|---|---|---|---|
| 299476 | 7/1917 | Fed. Rep. of Germany | 55/150 |
| 299576 | 7/1917 | Fed. Rep. of Germany | |
| 970787 | 1/1951 | France | |
| 57-20510 | 2/1982 | Japan | |
| 59-93915 | 5/1984 | Japan | |

OTHER PUBLICATIONS

Symposium Proceedings, 7th International Symposium on Plasma Chemistry, vol. 2, Eindhoven, The Netherlands, Jul. 1-5, 1985.
Fujii et al., "Discharge Processing of Combustion Gas", a paper presented at the 3rd Symposium on Plasma Processing, Kiryu, Gumma Pref., Japan, Jan. 28-30, 1986.

*Primary Examiner*—Bernard Nozick
*Attorney, Agent, or Firm*—Ronald P. Kananen

[57] ABSTRACT

An exhaust gas purifier unit has a bridged stream corona generator, an oil feeder for feeding oil to the bridged stream corona generator and an oil supplier for supplying an engine with oil stored in and flowing out of the bridged stream corona generator, so as to remove harmful gases contained in the exhaust gas, reliably over an extended period of time.

16 Claims, 3 Drawing Sheets

EXHAUST GAS PURIFIER UNIT

RELATED APPLICATIONS

This application is related to co-pending application Ser. No. 07/412,606, filed Sept. 27, 1989, which is a continuation of Ser. No. 07/120,012 filed Nov. 12, 1987, co-pending applicaiton Ser. No. 07/524,236, filed May 15, 1990, now U.S. Pat. No. 5,041,145, co-pending application Ser. No. 07/551,242 filed July 11, 1990.

FIELD OF THE INVENTION

This invention relates to an exhaust gas purifier unit which purifies exhaust gases from engines on cars and ships and from engines of captive electricity generation, etc. by corona discharge, and more particularly, to a bridged stream corona generator which can stably generate and maintain bridged stream corona discharge over an extended period of time.

PRIOR ART

One of the techniques heretofore used to achieve this end is disclosed in Japanese Patent Kokai Publication No. 57-20510. According to the disclosure, this prior art device comprises a corrugated dust collector in a cylindrical form and a desired number of discharge lines laid across a hollow portion of the dust collector. With a high voltage applied on the discharge lines, fine particles such as tar and graphite particles in the exhaust gas are removed. More specifically, the fine particles floating in the exhaust gas are attracted and deposited on to the inner wall of the cylindrical dust collector by the action of an intensive electrostatic field for their removal.

With such a prior art device as mentioned above, however, it is likely that the discharge lines may be torn down, when spark discharge occurs between the dust collector and the discharge lines.

Another disadvantage associated with such a prior art device is that it is still less than satisfactory in connection in the force a necessary with which harmful gases in exhaust fumes such as $NO_x$ and $CO_x$ are removed.

Recently, it has been proposed to make use of corona discharge as effective means for generating discharge to activate such harmful gases for their disassociation and elimination. With general corona discharge, however, a prospected value could not be reliably obtained.

Therefore, for the practical use of the technique for removing harmful gases by said corona discharge, it has been necessary to generate particular coronas, i.e., bridged stream coronas to ensure increased generation of the bridged stream coronas.

Additionally, in order to generate the bridged stream coronas stably over an extended period of time, it is required to eliminate the influence which might occur due to degeneration of bridged stream coronas, caused by, for example, deposition of carbonized particles, and the like.

SUMMARY OF THE INVENTION

The invention, accomplished with the foregoing problems in mind, provides an exhaust gas purifier unit including an enclosure portion having an inlet for introducing exhaust gas into the enclosure portion and an outlet for exiting purified exhaust gas from the enclosure portion. The exhaust gas purifier unit also includes a bridged stream corona generator located within said enclosure portion which includes at least one first electrode having projections thereon and at least one second electrode opposed to the first electrode. An insulator is provided on at least one surface of the second corona generator includes a high voltage source coupled between the first electrode and the second electrode for generating bridged stream coronas stably within a space defined by the first electrode and the insulator over an extended period of time to remove fine particles and harmful gases from the exhaust gas passing through the bridged stream coronas. A feeding means is provided for feeding oil into the bridged stream corona generator onto the surface of the insulator so that the oil is diffused and attracted to the surface to form an oil film thereon. A supply means is provided for supplying the feeding means with the oil and for supplying an engine with the oil flowing out from the bridged stream corona generator.

BRIEF DESCRIPTION OF THE DRAWINGS

The preferred embodiments in accordance with the present invention will now be described, by way of example, with reference to the accompanying drawings in which.

DESCRIPTION OF THE PREFERRED EMBODIMENTS

The exhaust gas purifier unit with the foregoing arrangement according to the present invention operates generally as follows.

Figure 1:
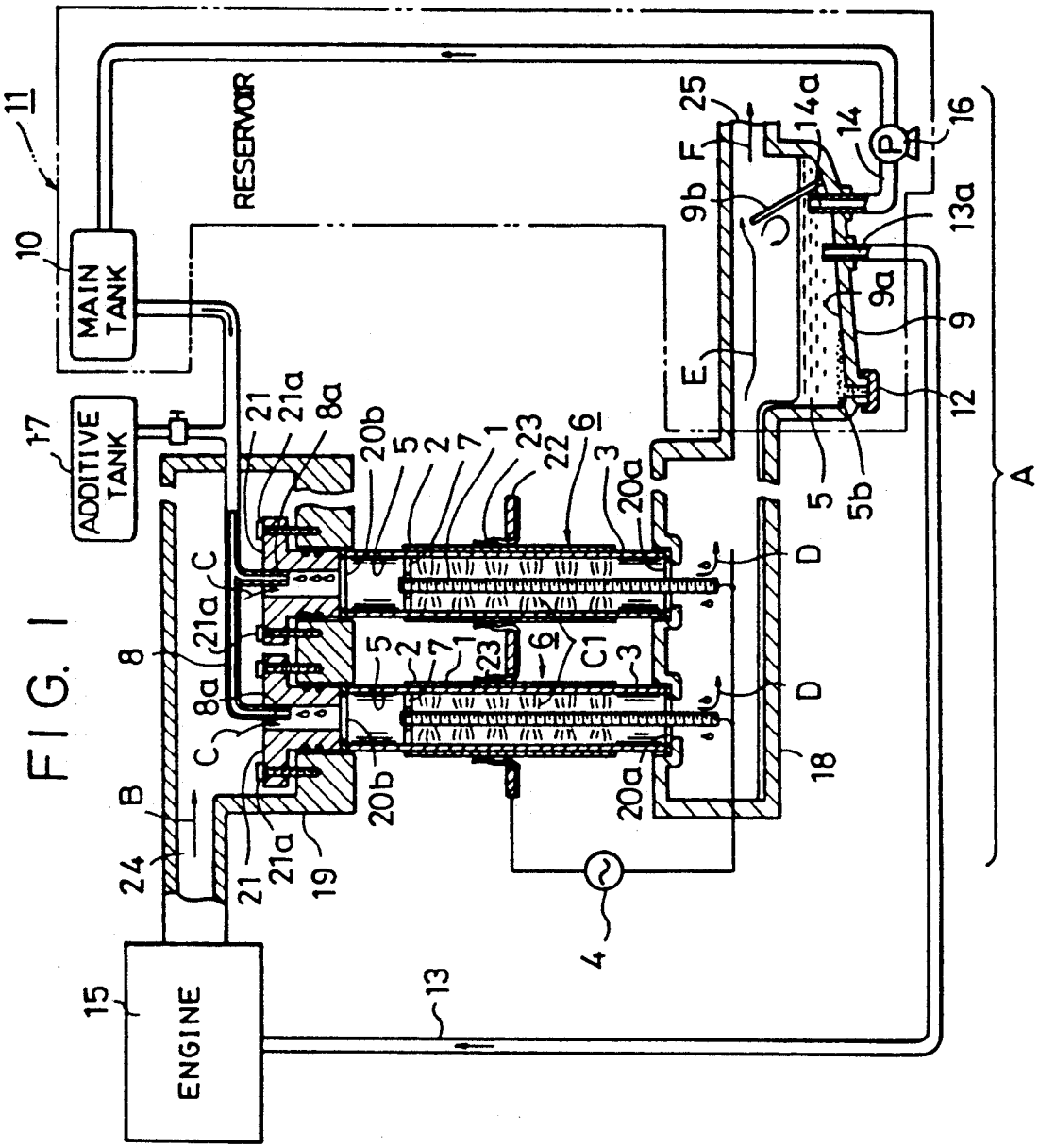
FIG. 1 is a vertical cross-sectional view of a first embodiment of the invention.
Figure 2:
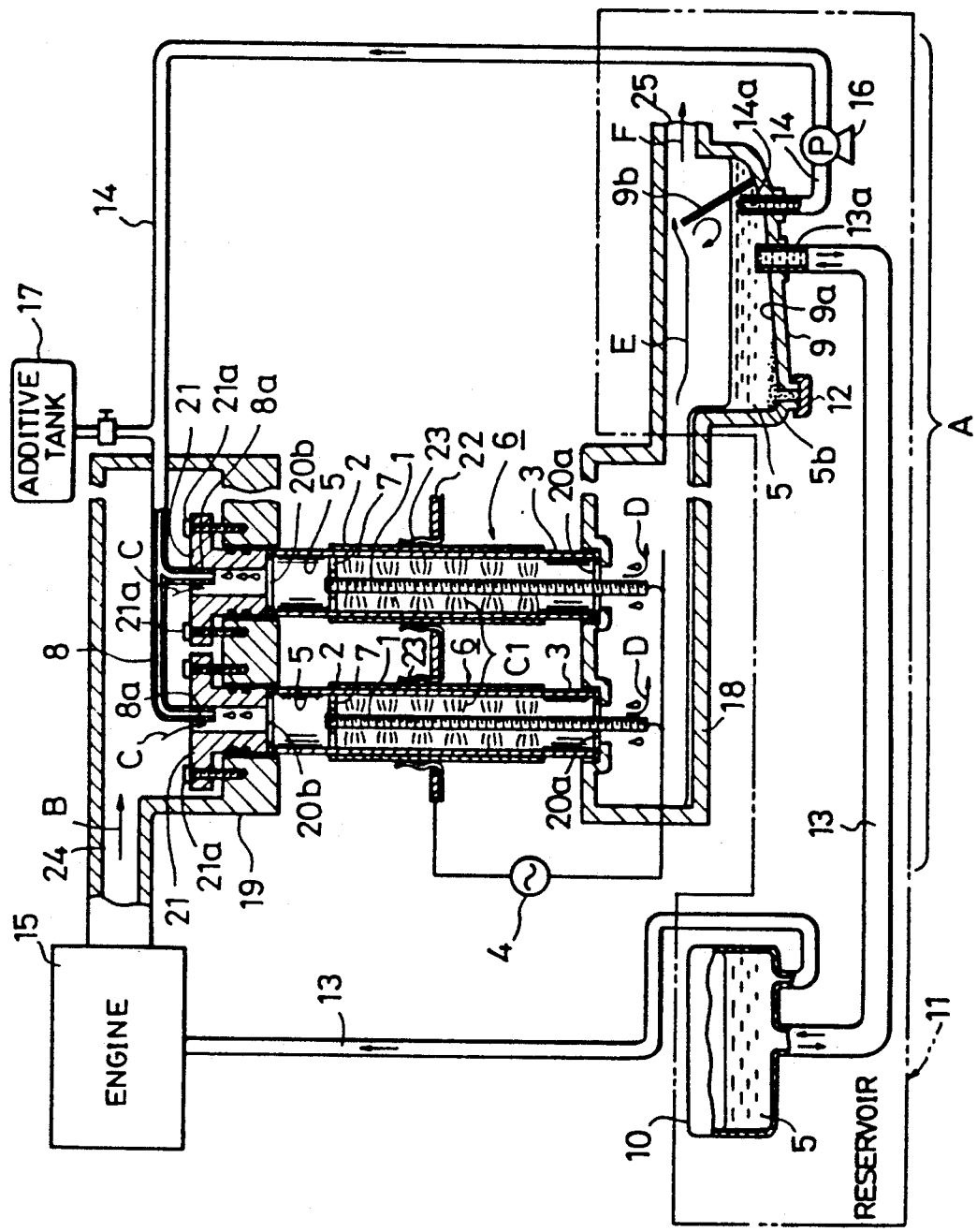
FIG. 2 is a vertical cross-sectional view of a second embodiment of the invention.
Figures 3, 4, 5:
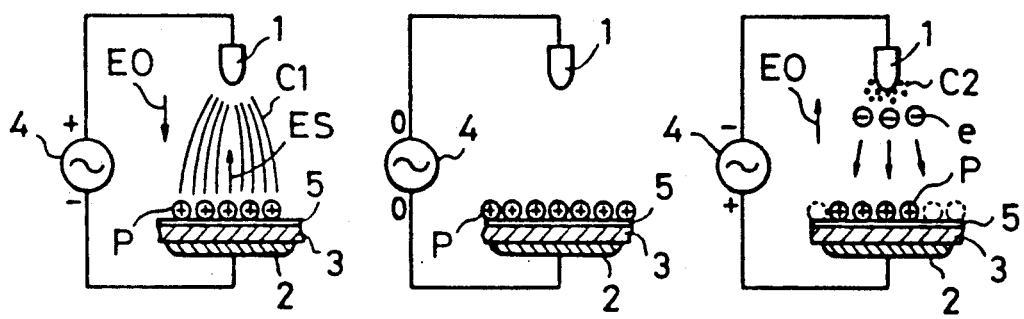
FIGS. 3 to 5 are schematic views for illustrating generation of coronas according to the present invention, with FIG. 3 showing generation of coronas of positive polarity, FIG. 4 showing a zero point state and FIG. 5 showing generation of coronas of negative polarity.

First, in the bridged stream corona generator, with a high voltage applied between the first electrode and the second electrode, bridged stream coronas are generated between the first electrode as shown in FIGS. 1 and 2, and in greater detail in FIGS. 3 to 5 and the insulator provided on the inner surface of the second electrode.

FIG. 3 shows that from a high voltage source 4, a plus voltage is applied to a first electrode 1 and a minus voltage is given to a second electrode 2.

An arrow shown by EO in FIG. 3 represents the direction of an electric field established by a high voltage applied between the first electrode 1 and the second electrode 2, while an arrow shown by ES denotes the direction of an inverse electric field created by charges built up on the surface of an insulator 3 covered with an oil 5a. Plus charges built up on the surface of the insulator 3 are indicated by P, while coronas of positive polarity, especially bridged stream coronas obtained by the maximum growth of the coronas of positive polarity, are shown by Cl.

In the status of FIG. 3, the bridged stream coronas Cl are generated, with plus charges P stored on the surface of the insulator 3. Depending on the quantity of the plus charges P, the inverse electric field ES is intensified and controls the bridged stream coronas Cl. As time goes by, the bridged stream corona Cl are changed and attenuated into brush coronas or film-shaped coronas which occur only in the vicinity of the first electrode 1.

Such changes and attenuations of the bridged stream coronas Cl result from an overload storage quantity or accumulation of the plus charges P. By using means for reducing the accumulation of excessive plus charges P, the bridged stream coronas Cl are permitted to increase and grow.

In this invention, generation of the bridged stream coronas Cl is ensured by neutralizing and reducing excessive accumulation plus charges P through the stages shown in FIGS. 4 and 5 referred to below.

FIG. 4 shows the so-called zero-point status where the output polarity of the high voltage source 4 is switched. In the status of FIG. 4, generation of the coronas is interrupted transiently.

FIG. 5 illustrates the opposite polarity status to the status of FIG. 3 wherein from the high voltage source 4 are applied a minus voltage to the first electrode 1 and a plus voltage to the second electrode 2.

In FIG. 5, e denotes electrons and C2 designates coronas with negative polarity.

In the status shown in FIG. 5, the first electrode 1 emits the coronas C2 of negative polarity and the electrons e. The electrons e are coupled to and neutralized with the plus charge P accumulated on the surface of the insulator 3.

This results in a reduction of excessive accumulation of plus charges P, and upon the status shown in FIG. 3 being restored, the bridged stream coronas Cl are generated.

As mentioned above, bridged stream coronas Cl are continuously generated in the bridged stream corona generator by repetitious transition from the status of FIG. 3 to the status of FIG. 5. However, when irregularities are produced along the surface of the insulator 3 due to adhesion of carbonized particles and the like thereto, its results in the disappearance or reduction of the bridged stream coronas Cl and transition into a spark discharge. According to the invention, however, an oil 5 such as for example egine oil, is supplied to the bridged stream corona generator 6 by the feeding means to wash away the deposits from the surface of the insulator 3. Therefore, stable generation of bridged stream coronas Cl in the generator 6 can be is maintained over an extended period of time.

By supplying exhaust gases to the bridged stream corona generator 6, harmful gases such as $NO_x$, $SO_x$, $CO_x$, and the like contained in the exhaust gas are oxidized into stable gases by $O_3$ (ozone) caused by the bridged stream coronas, or alternatively, by attraction to the bridged stream corona generator 6 by ion flow or other phenomena, the gas is purified.

FIRST EMBODIMENT 10 FIG. 1 is a vertical cross-sectional view showing a first embodiment of the invention.

In the same figure, reference numeral 6 denotes a bridged stream corona generator which generates the bridged stream coronas Cl in response to application of a high voltage source 4. The bridged stream corona generator 6 is composed of a first electrode 1, a second electrode 2, an insulator 3, the high voltage source 4 and a support 7.

In greater detail, the first electrode 1 may be formed by processing a stainless rod, for example, into a screw by a conventional threading method. The threading may be carried out by any appropriately selected method using a cutting machinery such as a milling machine or using a molding machinery such as a sintering machine. Then, the first electrode 1 is shaped to have a triangular cross-sectional thread or a trapezoidal cross-sectional thread by changing the flight pitch.

Then, the first electrode 1 is supported by the support 7 made of an insulative material at the center of the insulator 3 made of, for example, ceramics or other materials into a cylindrical form.

Outside the insulator 3 is deposited and formed the second electrode 2.

The second electrode 2 is formed by printing and sintering metal paste on the surface of the insulator 3 made of, for example, ceramics. Alternatively, the second electrode 2 may be first made of a metal pipe, followed by enamel processing, using organic glass, and the like applied to the surface of the second electrode 2 to form the insulator 3. Alternatively, the second electrode 2 may be a simply a combination of an insulative pipe and a metal pipe.

The first electrode 1 and the second electrode 2 are electrically coupled to the high voltage source 4. The high voltage source 4 is a circuit which generates a high voltage of both positive and negative polarities at a certain frequency, and its waveform may be any sine wave pulse wave and others.

The aforementioned frequency is constant or in synchronism with the revolutions of an engine such as ignition coil output, and the like.

Reference numeral 5 denotes the oil used in the bridged stream corona generator. It may be any oil suitable for cleaning of deposits onto the insulator 3 of the bridged stream corona generator 6. For example, viscous oil such as engine oil or gas oil may be used.

Reference numeral 8 denotes feeding means which is used to feed the oil 5 onto the surface of the insulator 3 on the side nearest to the first electrode 1 through a dropping hole 8a.

Reference numeral 9 refers to a sub tank which, in combination with a main tank 10 referred to later, forms reservoir means 11. The sub tank 9 stores the oil 5 flowing from the bridged stream corona generator 6. The sub tank 9 has a cap 12 removably attached to an opening therein for discharging sediment. The sub tank 9 interconnects supply means 13 and a circulating pipe 14. The supply means 13 consists of a pipe connecting the sub tank 9 and an engine 15 to supply the stored fuel oil 5 in the sub tank 9 to the engine 15. The engine 15 is a diesel engine. The circulating pipe 14 connects the sub tank 9 and the main tank 10 to circulate the stored oil 5 in the sub tank 9 to the main tank 10 by a pump 16.

Respective ends 13a and 14a of the supply means 13 and the circulating pipe 14 are terminated at slightly higher positions than the bottom surface 9a of the sub tank 9 to prevent the sediment 5b from entering thereto. The sub tank 9 is also provided with a hit plate 9b for separating mist of oil, and the like contained in the exhaust gas.

Reference numeral 10 denotes the main tank to which the oil 5 can be readily supplied from the exterior. The main tank 10, together with an additive tank 17, communicates with a feeding means 8. The additive tank 17 supplies an additive material such as detergent-dispersant to the oil 5. The detergent-dispersant herein refers to any material which disperses built-up precursor or oil oxide into the oil 5 in neutralized form or in particle status.

Reference numeral 18 denotes a lower duct, and 19 an upper duct. The lower duct 18 and the upper duct 19 are paths of exhaust gas. The lower duct 18 is connected to the sub tank 9 while the upper duct 19 is connected to the engine 15. Between the lower duct 18 and the upper duct 19 is sandwiched the bridged stream corona generator 6. In greater detail, a lower portion of the bridged stream corona generator 6 is pressed onto the lower duct 18 via a silicone rubber packing 20a while an upper portion thereof is pressed onto a setting member 21 via a packing 20b. The setting member 21 is fixed to the upper duct 19 by a screw 21a.

The setting member 21 is a metal element which facilitates removal and mounting of the bridged stream corona generator 6 for its maintenance.

Between the lower duct 18 and the upper duct 19 is provided a grounding plate 22 extending through a plurality of bridged stream corona generators 6. The grounding plate 22 is provided for ground connection of second electrodes 2 of respective bridged stream corona generators 6 together with an end of the high voltage source 4. The grounding plate 22 is electrically coupled to the second electrode 2 via a contact member 23. The contact member 23 is a substantially U-shaped metal element made of beryllium, copper alloy, etc., and facilitates removal and mounting of the bridged stream generator 6 for maintenance thereof.

Given below is an explanation of the operation of the exhaust gas purifier having the aforementioned arrangement, with reference to FIG. 1.

Exhaust gas sent from the engine 15 into the upper duct 19 through an inlet 24 as shown by an arrow B in the drawing moves in the bridged stream corona generator 6 as shown by an arrow C in the drawings. Thereupon, a number of bridged stream coronas Cl are generated by the bridged stream corona generator 6 due to electrical discharge phenomena, and the exhaust gas is forced to travel through the atmosphere of the bridges stream coronas Cl.

The exhaust gas contains harmful gases such as nitrogen compound ($NO_x$), etc., and these harmful gases the removed from the exhaust gas by ozone or ions produced in the bridged stream corona generator 6.

The exhaust gas, once having passed through the bridged stream corona generator 6, is purified, then travels to the lower duct 18 as shown by an arrow D, and is discharged through the sub tank 9 and an outlet 25 as shown by arrows E and F.

On the other hand, the oil 5 is poured from the main tank 10 to the bridged stream corona generator 6 via the feeding means 8 and the dropping hole 8a.

The fuel oil 5 dropped into the bridged stream corona generator 6 is diffused and attached to the surface of the insulator under a coulomb force or by ions between both electrodes where the bridged stream coronas Cl are produced.

Accordingly, the surface of the insulator 3 is cleaned by the oil 5, and it is maintained smooth and planar. The oil 5 which flows out from the bridged stream corona generator 6, reaches the sub tank 9 via the lower duct 18. At this time, part of the oil 5 is contained in the exhaust gas in the form of mist which hits the hit plate 9b provided in the sub tank 9, thereby losing its velocity to be recovered in the sub tank 9 for effective use later. The fuel oil 5 stored in the sub tank 9 is pumped up to the main tank 10 by the pump 16, and it is fed again to the bridged stream corona generator 6.

The oil 5 stored in the sub tank 9 is also supplied to the engine 15 via the supply means 13. Specifically, when a feed pump (not shown) provided to the engine 15 is activated by rotation of the engine 15, the feed pump applies a negative pressure to the supply means 13 to pump up the oil 5 held in the sub tank 9. Therefore, the oil 5, after cleaning the bridged stream corona generator 6, is stored in the sub tank 9 and supplied therefrom to the engine 15 for combustion.

SECOND EMBODIMENT

FIG. 2 is a vertical cross-sectional view showing a second embodiment of the invention which is basically the same as the first embodiment. In the following description, explanation of common parts is omitted, and different or additional parts alone are described.

In the second embodiment, the connecting position of the main tank 10 is different from the first embodiment. Specifically, the main tank 10 in the second embodiment is provided midway of the supply means 13. The main tank 10 is situated at substantially the same height as the sub tank 9, and the diameter of the supply means 13 connecting the main tank 10 to the sub tank 9 is relatively large. Therefore, upon acceleration or braking of the car, for example, the oil 5 moves between the main tank 10 and the sub tank 9 under inertia, so that the oil 5 in the sub tank 9 is diluted by the fuel oil 5 in the main tank 10.

In either embodiment, the high voltage source 4 is shown as being a source which generates a voltage of both positive and negative polarities, i e. an alternating voltage. However, it is not limited to such, but it may be a source which generates a d.c. voltage.

Note here, however, that the use of a d.c. voltage for generating bridged stream coronas Cl causes excessive accumulation of charges on the surface of the insulator 3 nearer to the second electrode 2, which in turn causes a reverse electric field. Therefore, bridged stream coronas Cl represent transition to film-like coronas or spark discharge, which results in difficulty of stable generation and supply of the bridged stream coronas Cl.

In this respect, a proposal is suggested below to stably maintain bridged stream coronas Cl for employment of a d.c. voltage as the high voltage source 4. Specifically, the insulator 3 may be made of a material having an appropriate electrical resistance on the order of the electrical resistance of asbestos.

EFFECT OF THE INVENTION

This invention is characterized in the use of the feeding means for feeding fuel oil to the bridged stream corona generator 6 forming the exhaust gas purifier unit, as well as the use of supply means for supplying oil flowing out from the bridged stream corona generator into the engine.

Therefore, deposits onto the surface of the insulator nearer to the first electrode can be washed down by the oil, which ensures large-scaled bridged stream corona discharge to be stably maintained and generated over an extended period of time. By passing exhaust gas of a car through the corona generator, harmful gases contained in the exhaust gas can be reliably removed over an extended period of time, and the recovered oil can be reused as fuel oil for the engine, which results in an excellent advantage from the economical viewpoint.

What is claimed is:

1. An exhaust gas purifier unit comprising:

an enclosure portion including an inlet for introducing exhaust gas into said enclosure portion and an outlet for exiting purified exhaust gas from said enclosure portion;

a bridged stream corona generator located within said enclosure portion which includes at least one first electrode having projections thereon and at least one second electrode opposed to said first electrode;

an insulator provided on at least one surface of said second electrode opposed to said first electrode;

said bridged stream corona generator includes a high voltage source coupled between said first electrode and said second electrode for generating bridged stream coronas stably within a space defined by said first electrode and said insulator over an extended period of time to remove fine particles and harmful gases from said exhaust gas passing through said bridged stream coronas;

feeding means for feeding oil into said bridged stream corona generator onto said surface of said insulator so that said oil is diffused and attracted to said surface to form an oil film thereon; and supply means for supplying said feeding means with said oil and means connected to said bridged stream corona generator for supplying an engine with said oil.

2. The exhaust gas purifier unit according to claim 1 wherein said high voltage source is a d.c. high voltage source.

3. The exhaust gas purifier unit according to claim 1 wherein said high voltage source is an ac.c. high voltage source.

4. The exhaust gas purifier unit according to claim 1 wherein said means includes a sub tank for receiving and accumulating said oil diffused and attracted to said surface of said electric insulator.

5. The exhaust gas according to claim 4 wherein said means includes a circulating pipe interconnecting the sub tank with a main tank through a pump for supplying said oil therethrough.

6. The exhaust gas according to claim 5 wherein said circulating pipe includes an end portion connected to and extending into said sub tank for avoiding suction of precipitates within said oil.

7. The exhaust gas purifier unit according to claim 6 wherein said means includes a pipe interconnecting said sub tank and said engine.

8. The exhaust gas purifier unit according to claim 4 wherein said means includes a circulating pipe interconnecting said sub tank and said enclosure portion through a pump for supplying said oil therethrough to said engine.

9. The exhaust gas purifier unit according to claim 8 wherein said enclosure portion includes an upper portion and a lower portion, said lower portion includes a lower duct and said upper portion includes a upper duct pressed against a set member through a packing member to facilitate removal of said bridged stream corona generator and remounting of said bridged stream corona generator upon maintenance thereof.

10. The exhaust gas purifier unit according to claim 8 wherein said supply means includes an additive tank connected to said circulating pipe.

11. The exhaust gas purifier unit according to claim 8 wherein said means includes a first pipe interconnecting the sub tank with a main tank whereby said oil may flow between said sub tank and said main tank.

12. The exhaust gas purifier unit according to claim 11 wherein said means includes a second pipe interconnecting said main tank with said engine for supplying said oil therethrough to said engine.

13. An exhaust gas purifier unit comprising:

an enclosure portion including an inlet for introducing exhaust gas into said enclosure portion and an outlet for exiting purifier exhaust gas from said enclosure portion;

a bridged stream corona generator located within said enclosure portion including at least one first electrode having projections thereon and at least one second electrode opposed to said first electrode;

an insulator provided on at least one surface of said second electrode opposed to said first electrode;

said bridged stream corona generator including a high voltage source coupled between said first electrode and said second electrode for generating bridged stream coronas stably within a space defined by said first electrode and said insulator over an extended period of time to remove fine particles and harmful gases from said exhaust gas passing through said bridged stream coronas;

feeding means for feeding oil into said bridged stream corona generator onto said surface of said insulator so that said oil is diffused and attracted to said surface to form an oil film thereon; and supply means for supplying an engine with said oil, said supply means includes a tank, a sub tank and a pump interconnected by at least one pipe, whereby said oil flowing out from said bridged stream corona generator is accumulated in said sub tank and a portion of said oil is recirculated through said bridged stream corona generator and a portion is supplied to said engine.

14. The exhaust gas purifier unit according to claim 13 wherein said supply means supplies said oil to said tank and then to said engine.

15. The exhaust gas purifier unit according to claim 13 wherein said supply means includes at least one pipe to supply said oil to said tank and then to said bridged stream corona generator.

16. The exhaust gas purifier unit according to claim 13 wherein said supply means includes an additive tank means and at least one pipe for supplying an additive material to said oil.

* * * * *